United States Patent Office 3,350,848
Patented Nov. 7, 1967

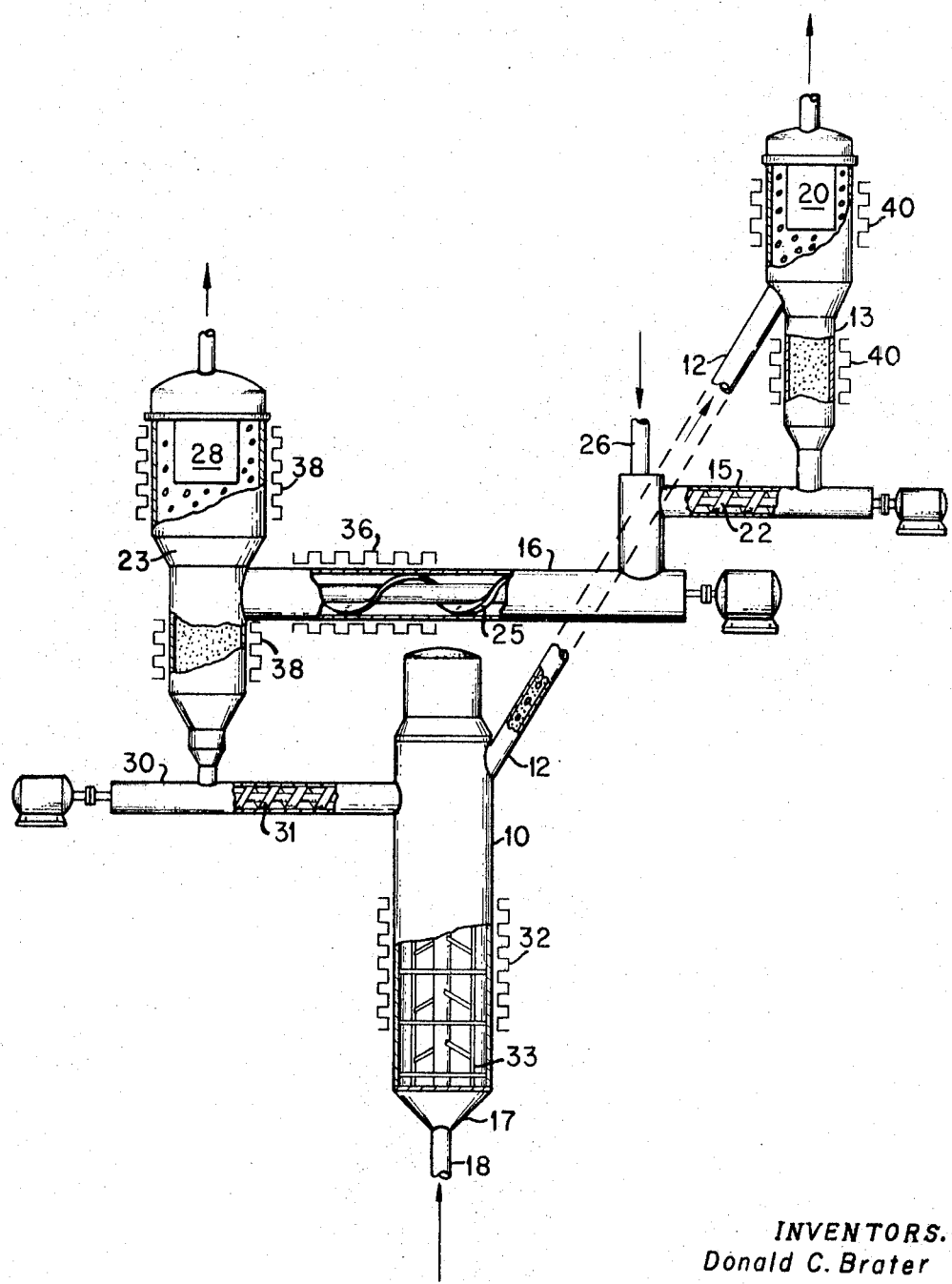

3,350,848
CONTINUOUS SORPTION-DESORPTION
SYSTEM AND METHOD
Donald C. Brater and Joseph Dykstra, Jr., Oak Ridge, Harry L. Kaufman, Kingston, and Seymour H. Smiley, Oak Ridge, Tenn., assignors to the United States of America as represented by the United States Atomic Energy Commission
Filed Apr. 26, 1966, Ser. No. 546,144
3 Claims. (Cl. 55—71)

ABSTRACT OF THE DISCLOSURE

The selective recovery of uranium hexafluoride from a mixture of gases is achieved by utilizing a sorption-desorption system in which particulate sodium fluoride is continually circulated through the system while being subjected to successive and continuous sorption-desorption cycles.

---

The invention described herein was made in the course of, or under, a contract with the U.S. Atomic Energy Commission. This invention relates generally to the selective recovery of a particular product gas or gases from a mixture of gases in a continuous manner, and more specifically to a method and system particularly suitable for the recovery of uranium hexafluoride ($UF_6$) from a mixture of gases by subjecting the latter to a continuous sorption-description operation in which a sorbent material in particulate form is exposed to successive sorption-desorption cycles.

The removal and recovery of a product gas from a mixture of gases comprising the product gas and at least one non-sorptive gas have been previously achieved by using a sorbing agent to remove the product gas from the mixture and thereafter recovering the product gas by desorbing it from the agent. The previously known systems using this technique with any degree of success normally comprise batch-operated fixed beds of sorbent material in the form of pellets. The sorption-desorption system of the present invention also accomplishes the removal and recovery of the product gas from such a mixture of gases, but does so in a manner exhibiting substantial improvements over previously practiced sorption and desorption techniques. Generally, in the system of the present invention, sorption and desorption of a product gas or gases are conducted in a continuous fashion by utilizing a fluid-bed sorber and a regenerator with a sorbent material in particulate or powder form and with the sorber and regenerator being interconnected in such a manner by suitable piping or conduits that at any given time in a typical sorption-desorption operation the following events are occurring simultaneously. The mixture of gases containing the product gas is flowing into the sorber to establish and maintain the sorbent in a fluidized state while effecting sorption of the product gas by the sorbent; the product-rich sorbent is being conveyed from the sorber to the regenerator, where the product gas is being removed from the sorbent by desorption; and the desorbed or regenerated sorbent is being returned to the sorber for repeating the absorption-desorption cycle. Thus, the sorption-desorption operation is conducted in a continuous manner with the sorbent being successively and continuously subjected to sorption-desorption cycles.

The advantages of the sorption-desorption system and method of the present invention over previously known sorbing and desorbing techniques are manyfold with perhaps some of the more important advantages including the attainment of a larger throughput than available with previous fixed-bed sorbent systems of comparable size; lower inventory of sorbent; elimination of sorbent deterioration or break-up normally encountered when using sorbent in pellet form, as is customary in fixed-bed sorbent systems; and steady flow of sorbent and gases which provides a uniform flow rate substantially lower than the peak and low flows present in batch-operated, fixed-bed sorbent systems.

The present invention has been found to be particularly advantageous for the recovery of $UF_6$ from a process stream comprising $UF_6$ and nitrogen ($N_2$) while employing sodium fluoride (NaF) powder as the sorbent. Thus, while the following description of the present invention will be directed primarily to such $UF_6$ recovery, it should be understood that other fluorides, e.g., chromium fluoride, molybdenum fluoride, etc., may be similarly removed and recovered from a mixture of gases including other sorbable or non-sorbable gases by using sorbing agents such as particulate NaF, lithium fluoride, or any other suitable sorbent material in particulate form.

An object of the present invention is to provide a new and improved system and method for the selective removal and recovery of a particular gas or gases from a mixture of gases by continuous sorption-desorption.

Another object of the present invention is to provide for continuous sorption-desorption in a manner exhibiting substantial advantages over previous sorption-desorption techniques from standpoints of economy and overall operational efficiency.

Another object of the present invention is to provide for continuous sorption-desorption by using a sorbent material in particulate or powder form.

A further object of the present invention is to provide for the selective recovery of product gas or gases by utilizing a sorption-desorption operation in which the sorbent material is continually circulated through the system while being subjected to successive and continuous sorption-desorption cycles.

A still further object of the present invention is to provide a system and method wherein sorbent material bearing a particular product gas or gases is, in effect, transferred in a fluidized state from a sorber to a regenerator for recovery of the product gas or gases and thence back to the sorber for subsequent sorption.

A still further object of the present invention is to provide for the removal and recovery of $UF_6$ from a gas mixture by utilizing a continuous sorption-desorption operation in which the sorbent material is powdered NaF.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

In the accompanying drawing:

The figure is a somewhat schematic view showing a preferred form of the continuous sorption-desorption system of the present invention.

Described generally, the recovery of $UF_6$ from a process stream composed of a mixture of gases including the $UF_6$ and at least one non-sorptive gas, e.g., $N_2$, may be readily achieved by utilizing the novel continuous sorption-desorption system of the present invention. In this system a plurality of sorbent containment structures may be interconnected in a serial arrangement by suitable piping or conduit means so as to provide an uninterrupted or continuous flow path therebetween for establishing successive or repetitive cycles of sorbent material through the various containment means and conduit means. One of these containment means functions as a sorber for removing the $UF_6$ from the process stream while another functions as a regenerator for recovering or desorbing the $UF_6$ from the sorbent while simultaneously regenerating the latter. Thus, when the process stream is introduced into the sorber which contains a quantity of particulate sorbent material, e.g., NaF, that has been heated to a desired sorbing temperature, the sorbent while sorbing $UF_6$ from the process stream becomes fluidized so as to facilitate the transfer of the $UF_6$-rich sorbent to the regenerator for recovery of the $UF_6$ by heating this sorbent to a substantially higher temperature than that used in the sorber. The regenerated or desorbed sorbent is then returned to the sorber for repeating the sorption-desorption cycle.

The sorbent is divided among the various containment means and conduit means so that at any given instance during a typical sorption-desorption operation some of the sorbent is sorbing $UF_6$, some is being desorbed, and some is in other containment means and conduit means on the way to or from the sorber or regenerator. The other non-sorptive gases in the gas stream and the recovered $UF_6$ are respectively removed from the sorbent flow prior to entering the regenerator and returning to the sorber.

Described in greater detail and with reference to the drawing, the sorption-desorption system of the present invention may comprise a fluid-bed sorber 10 coupled by a pipe or conduit 12 to a hopper or sorbent container 13, which, in turn, is coupled by a pipe or conduit 15 to a regenerator 16.

The sorber 10 is preferably of an elongated tubular configuration oriented in a vertical or upright position and includes a conical bottom portion 17 having a suitable conduit 18 attached thereto for conveying the process stream or other $UF_6$-containing gases into the sorber 10. The conduit 12 connecting the sorber 10 to the hopper 13 is preferably coupled to the sorber 10 so as to be in registry with the interior of the sorber 10 adjacent the uppermost end thereof.

The hopper 13 may also be of a tubular configuration disposed in an upright position with the conduit 12 being coupled to the hopper 13 intermediate the ends thereof and with the conduit 15 leading to the regenerator 16 being coupled to the lowermost end thereof for facilitating sorbent flow therefrom by gravitational forces. The hopper 13 may include an internally disposed filter 20 or a plurality of such filters adjacent the uppermost end thereof and communicating with external piping for filtering and removing from the system non-sorptive gases and some sorbable gases which may possibly include a small quantity of $UF_6$, as will be explained in greater detail below. The filter 20 may be of any suitable type or configuration, such as, for example, a tubulation of sintered Monel metal.

Sorbent rich in $UF_6$ and other sorbed gases is discharged from the bottom of the hopper 13 and conveyed through conduit 15 to the regenerator 16 in any suitable manner. For example, a motor-driven feed screw or screw-type conveyer 22 disposed in conduit 15 and extending at least substantially the full length thereof has been found to be a satisfactory mechanism for transferring the sorbent into the feed end of the regenerator 16.

The particular type regenerator used for desorbing or recovering the $UF_6$ from the sorbent depends primarily upon the $UF_6$ concentration desired. For example, the $UF_6$ concentration may be about 2 to about 5 percent when using a fluid-bed regenerator and about 10 to about 50 percent when using a screw-type regenerator such as shown in the drawing. This screw-type regenerator 16 may comprise an elongated cylinder disposed in a horizontal position and coupled adjacent one end thereof to the conduit 15 for receiving sorbent therefrom and coupled at the other end thereof to a hopper 23 which provides a suitable receptacle for receiving the regenerated sorbent discharged from the regenerator. Within the regenerator 16 there may be disposed a motor-driven, ribbon-flight scew or conveyer 25 for moving the sorbent through the regenerator while facilitating the desorption and regeneration of the sorbent.

Inasmuch as uranium-florine compounds other than uranium hexafluoride may be formed in the regenerator during the desorption of the sorbent, it may be desirable to introduce a suitable volume of fluorine gas ($F_2$) into the regenerator to inhibit the formation of such undesirable compounds. This gaseous $F_2$ is preferably introduced into the regenerator 16 at a location adjacent to the connection with the sorbent feed conduit 15 such as by a suitable conduit 26 so as to thereby provide an arrangement wherein a concurrent flow of the sorbent and $F_2$ is established and maintained throughout the effective length of the regenerator.

In addition to the introduction of gaseous $F_2$ into the regenerator, a suitable purge or sweep gas, such as, for example, nitrogen ($N_2$) or air, may be introduced through conduit 26 along with the $F_2$ for assuring satisfactory regenerator operation such as by preventing or minimizing the caking of $UF_6$-laden NaF.

The hopper 23 may be of a construction and disposition similar to that of hopper 13 and also house a filter or filter assembly 28 at the uppermost end thereof above the connection with the regenerator 16 for removing the desorbed $UF_6$ and other gases from the flow discharging from the regenerator so as to leave substantially only the desorbed or regenerated sorbent in the lower portion of the hopper 23. In order to return this regenerated sobent to the sorber 10 for sorbing more $UF_6$, a sorbent-conveying conduit 30 may be coupled between the lowermost end of the hopper 23 and the sorber 10 at a location intermediate the connections of conduits 12 and 18 thereto. This conduit 30 may be provided with a feed screw or screw-type conveyer 31 similar to that in conduit 15 for facilitating the transfer of the sorbent from the hopper 23 to the sorber 10.

The screw-type conveyers 22, 31 also provide another important function besides that of conveying sorbent in that these conveyers inhibit or minimize the passage of any gases through the conduits 15 and 30 in a direction contrary to the sorbent flow. In other words, the gases in the sorber 10 are prevented from flowing through conduit 30 to hopper 23 while the $F_2$ and/or other gas entering the regenerator 16 through conduit 26 is prevented from flowing through conduit 15 to hopper 13.

As briefly mentioned above, the sorbent material preferably used in the sorption-desorption system of the present invention comprises NaF powder. This powder may be selected from any suitable size range capable of being fluidized and providing satisfactory sorption-desorption properties. For example, satisfactory results have been achieved by using an NaF powder charge having a mesh size ranging from about −200 to about +325 mesh or less. During operation some of the larger NaF powders break down to smaller powders, but such an occurrence does not disrupt or otherwise detract from the sorption-desorption operation. The quantity of NaF powder used in the sorption-desorption system may vary from system to system depending upon the overall size and capacity of the particular system. For example, in a system having a sorber of about six inches in a diameter and about forty-two inches long and a regenerator of about six inches in diameter and about ninety-six inches long, the total quantity of NaF powder used may be about two hundred pounds. This quantity of powder is preferably divided among the various containment structures so that each contains a portion of the powder charge.

To remove and recover gaseous $UF_6$ from a gaseous process stream while using a sorption-desorption system of approximately the above-mentioned size and capacity, the $UF_6$-containing process stream may be introduced into the sorber 10 through conduit 18 at a rate of about 2 to about 6 pounds per hour and at a velocity of about 0.15 to about 0.70 feet per second. This flow rate has been found to be satisfactory for at least substantially fluidizing the sorbent bed in sorber 10 to provide for the flow of the fluidized sorbent through conduit 12 to the hopper 13 while maintaining the pressures within the system at about ambient pressure. In order to effect the desired sorbing reaction between the NaF powder and the $UF_6$ to assure that other sorbable materials such as molybdenum hexafluoride and hydrogen fluoride will pass through the fluid bed without being absorbed, the sorber and its contents are preferably heated to a temperature of about 250° F. to about 280° F. This heating may be provided by any suitable heating mechanism having an adequate temperature control, such as, for example, a steam or electrically heated coil such as generally indicated at 32 may be used. The fluidized bed during this sorbing reaction may be stirred by a suitable stirring device 33 for promoting heat transfer and minimizing sorbent caking. It may be preferable to use a blade-type stirrer or agitator which is capable of sweeping the sorber walls. A satisfactory speed for this stirring device may range from about 20 to about 40 revolutions per minute.

The process gas flowing through the fluidized sorbent bed into the conduit 12 entrains $UF_6$-laden sorbent from the bed and conveys it to the hopper 13 where the process gas is vented from the hopper through the filter 20 while the sorbent accumulates in the hopper. The gases vented through filter 20 comprise at least substantial portions of the non-sorptive gases and some sorbable gases which may include trace quantities of $UF_6$ which escape sorption. This $UF_6$ may be recovered by passing these vented gases through suitable batch NaF pellet traps (not shown).

As the $UF_6$-laden sorbent accumulates in the hopper 13, the sorbent in the lower part of the hopper 13 is being continuously fed into the regenerator 16 by feed screw 22. Once in the regenerator 16 the sorbent is heated to a temperature of at least 650° F. and preferably about 750° F. as it moves through the regenerator under the influence of the screw conveyor 25 so as to desorb and regenerate the sorbent by breaking up the $UF_6$-NaF complex and driving off the $UF_6$. This heating may be achieved in any suitable manner such as by an electrical heating coil generally shown at 36. The $F_2$ and other gas added to the sorbent flow in the conveyor assure that the uranium-fluorine gas formed in the regenerator is essentially all $UF_6$ and that the sorbent movement or desorption will not be impeded by caking or the like. Normally, about 0.3 of a pound of $F_2$ gas per hour will satisfactorily prevent the formation of other uranium-fluorine compounds in a system of the size described, but a greater quantity of $F_2$ gas may be required in larger systems.

The regenerated sorbent along with the $UF_6$ and other gases is discharged into the hopper 23 where the $UF_6$ and the other gases are vented from the hopper 23 via the filter 28. These gases may be conveyed into conventional cold traps (not shown) for selectively recovering the $UF_6$.

As the regenerated or desorbed sorbent is discharged into the hopper 23 from the regenerator 16, the sorbent in the bottom portion of this hopper is being fed into the sorber 10 by the feed screw 31 for replenishing the sorbent in the sorber 10 and thereby subjecting such regenerated sorbent to another sorption-desorption cycle.

In order to prevent re-absorption of the $UF_6$ by the sorbent discharged into the hopper 23 due to the presence of $UF_6$ in the hopper 23 before it is vented off, it may be preferable to maintain at least the upper quantity of regenerated sorbent at a temperature of at least about 650° F. A suitable electrical heating element 38 may be satisfactorily used for this heating. Also, if desired, the sorbent in the hopper 13 may be heated or maintained at a temperature corresponding generally to the sorption temperature by using a heating device 40 which may be similar to that used for the sorber 10.

Inasmuch as the regenerated sorbent in hopper 23 may tend to cake or otherwise stick together, it may be desirable to provide hopper 23 with a suitable stirring mechanism (not shown) for assuring that the sorbent flow in hopper 23 will not be impeded. This stirring mechanism may be similar to the stirrer 33 disposed in sorber 10.

It will be seen that the present invention sets forth a novel sorption-desorption system wherein the removal and recovery of a product gas or gases from a gaseous process stream or other mixture of gases may be achieved in a highly efficient and effective manner. Further, the present invention may be used in nuclear reactor fuel processing applications, such as, for example, the recovery of uranium, in the form of $UF_6$, from spent fuel elements. In this application a suitable fluorinating agent such as bromine pentafluoride ($BrF_5$) may be used to fluorinate the uranium. Also, the present sorption-desorption system may be used to not only recover the $UF_6$, but to also separate it from various fission product fluorides. For example, sorbing at a temperature of about 250° F. allows bromine compounds and some fission product fluorides, e.g., molybdenum fluoride, to pass unabsorbed through the fluid bed while some of the co-sorbed fluorides, e.g., niobium fluoride and ruthenium fluoride, are retained on the NaF sorbent after desorption thereof for providing further purification of the $UF_6$.

If desired, the sorption-desorption system of the present invention may be modified to incorporate several desorbers for providing a staging arrangement whereby selective separation of one sorbable material from another may be readily achieved. In this arrangement, two or more sorbable materials, e.g., $UF_6$ and $MoF_6$, sorbed by a suitable sorbent, e.g., NaF, may be separated from nitrogen and other undesirable gases and materials and thereafter successively introduced into a first desorber for freeing the $MoF_6$ and a second desorber for freeing the $UF_6$. Further, the sorbent material used in the sorption-desorption system of the present invention may consist of more than one sorbent material, such as, for example, sodium fluoride and lithium fluoride, to give the system greater flexibility.

As various changes may be made in the operation, form, construction, and arrangement of the parts herein without departing from the spirit and scope of the invention and without sacrificing any of its advantages, it is to be understood that all matter herein is to be interpreted as illustrative and not in a limiting sense.

We claim:
1. A process for essentially completely sorbing and desorbing gaseous $UF_6$ from a stream of mixed gases including the $UF_6$ and at least one nonsorptive gas, comprising the steps of continuously flowing the stream of mixed gases into a bed of particulate sodium fluoride for fluidizing at least a portion of the bed and for exposing the $UF_6$ to the sodium fluoride for sorption thereby, continuously conveying fluidized particulate sodium fluoride from the bed for subsequent discharge into a region maintained at a temperature sufficient to desorb $UF_6$ from the sodium fluoride, separating at least a substantial portion of said at least one nonsorptive gas from the flow of fluidized sodium fluoride, and thereafter introducing into the sodium fluoride at least one of the gases selected from the group consisting of gases containing fluorine and nitrogen prior to discharging the sodium fluoride into said region, recovering the $UF_6$, and there- after discharging the desorbed sodium fluoride into the bed for further sorption of $UF_6$.

2. A process for essentially completely sorbing and desorbing gaseous $UF_6$ from a stream of mixed gases including $UF_6$ and at least one nonsorptive gas, comprising the steps of continuously flowing the stream of mixed gases into a bed of particulate sodium fluoride for fluidizing at least a portion of the bed and for exposing the $UF_6$ to the sodium fluoride for sorption thereby, continuously conveying the fluidized sodium fluoride from the bed, separating at least a substantial portion of said at least one nonsorptive gas from the flow of fluidized sodium fluoride, collecting the flow of fluidized sodium fluoride to at least substantially defluidize the flow and to facilitate the separation of said at least one nonsorptive gas, conducting collected sodium fluoride to a region maintained at a temperature sufficient to desorb $UF_6$ from the sodium fluoride, introducing a gaseous fluorine into the particulate sodium fluoride for concurrent flow therewith through at least a substantial portion of said region in a volume sufficient to substantially inhibit the formation of uranium-fluorine compounds in said region other than $UF_6$, recovering the $UF_6$ after traversing said region, collecting the particulate sodium fluoride to facilitate the recovery of the $UF_6$ desorbed from the sodium fluoride in said region, maintaining at least a portion of the desorbed sodium fluoride at a temperature sufficient to inhibit sorption of $UF_6$ by the desorbed sodium fluoride, and thereafter discharging the desorbed sodium fluoride into the bed for further sorption of $UF_6$.

3. A process for essentially completely sorbing and desorbing $UF_6$ from a stream of mixed gases as claimed in claim 2, including the additional step of agitating the bed of particulate sodium fluoride for facilitating fluidization of the bed and sorption of the $UF_6$.

References Cited
UNITED STATES PATENTS

| | | | |
|---|---|---|---|
| 1,577,534 | 3/1926 | Miller | 55—77 X |
| 2,391,334 | 12/1945 | Nicholson | 55—79 X |
| 2,397,566 | 4/1946 | Schutte | 55—181 |
| 3,093,465 | 6/1963 | Latta | 55—78 X |
| 3,178,258 | 4/1965 | Cathers et al. | 55—71 X |
| 3,220,165 | 11/1965 | Howie | 55—71 |

REUBEN FRIEDMAN, *Primary Examiner.*

J. ADEE, *Assistant Examiner.*